March 31, 1942.   E. SCHULTHESS   2,277,786
PRESSURE HOSE
Filed March 18, 1940

WITNESS

INVENTOR
ERNEST SCHULTHESS
BY
ATTORNEYS

Patented Mar. 31, 1942

2,277,786

UNITED STATES PATENT OFFICE 2,277,786

PRESSURE HOSE

Ernest Schulthess, South Orange, N. J.

Application March 18, 1940, Serial No. 324,592

6 Claims. (Cl. 138—56)

This invention relates to a hose construction which has special application to the transfer of fluids under pressure as distinguished from what is known as suction hose or suction and discharge hose such as shown, for example, in my Patent No. 1,810,032, issued June 16, 1931 and which may be used, for example, as a cargo and dock hose for loading and unloading oil tankers, oil barges, etc.

An object of the invention is to provide a pressure hose of improved and relatively inexpensive construction and having an exterior surface which minimizes chafing and abrasion and facilities handling and having an interior surface which reduces to a minimum resistance to the flow of fluid therethrough. A further object of the invention is to provide an improved pressure hose which is capable of withstanding sharp bends without injury, will withstand heavy transverse and longitudinal pressures and strains and will resist deterioration by the fluid being transferred.

Figure 1:
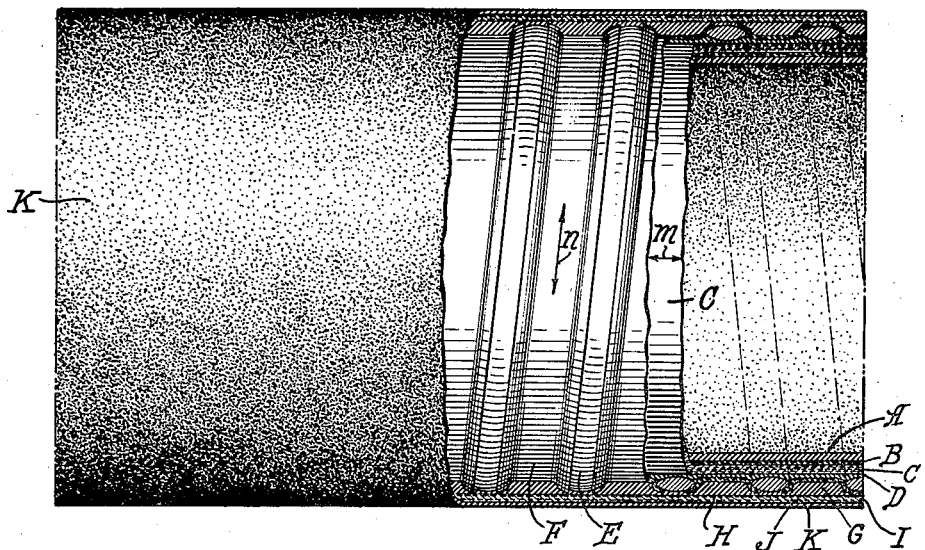
Figure 2:
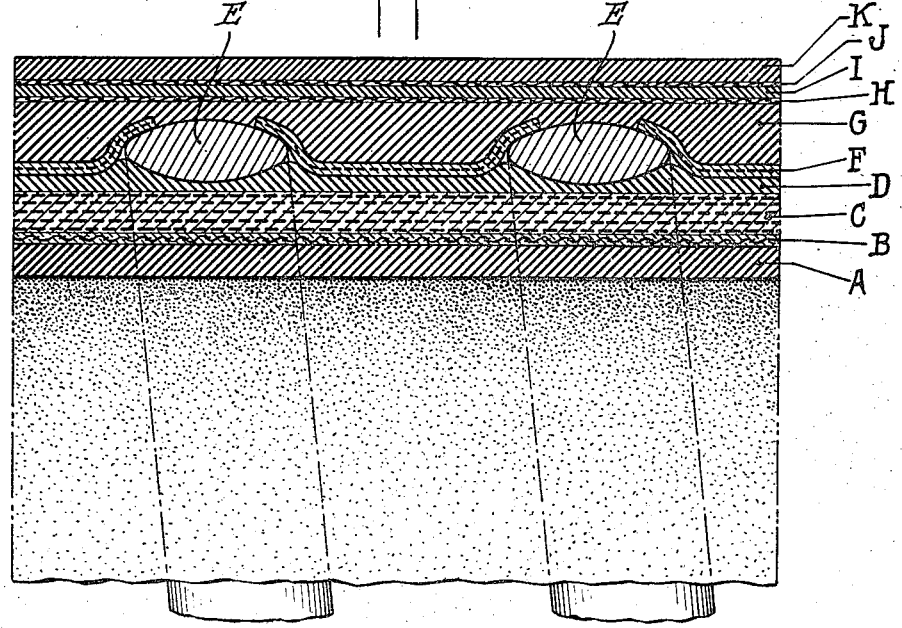

Other objects and advantages of the invention as well as the novel features of construction thereof will appear from a perusal of the following description read in connection with the accompanying drawing which illustrates a particular embodiment of my improved pressure hose and in which Fig. 1 shows a portion of the hose partly in section and Fig. 2 shows a segment of such hose in section.

In the drawing, the reference character A designates a tube of rubber or gum which forms the interior surface of the hose and provides a smooth, continuous passageway for the transfer of the fluid. The composition of the rubber or gum is governed by the type of fluid which is to be transferred through the hose. For example, when the hose is to be utilized for the purpose of transporting hydrocarbon fluids, such as oil, I prefer to make the tube A of a synthetic rubber, such as the synthetic rubber compound known as "Duprene."

Over the rubber tube A is applied one ply of an open mesh fabric B such as "Leno" fabric or "Breaker" strip. The spaces between the threads of the open mesh fabric B enable the rubber of the tube A which is in a putty condition when the fabric B is applied, to penetrate through the fabric and anchor itself to the outer layer of the plies of material designated C thereby producing an exceptionally strong and lasting bond between the tube A and the plies of fabric C. Due to the construction of the fabric ply B it readily permits pulsating of the hose while the fluid is being pumped therethrough and flexure of the hose thereby giving the hose a freedom of movement without creating any strains or stresses in the hose structure.

The fabric C overlying the open mesh fabric B is composed of a strip of material having a longitudinal dimension as long as a section of hose and a width sufficiently great to enable it to be wound about the tube A and fabric B into two or more plies. The number of plies into which the fabric strip C is wound is governed largely by the inside diameter of the hose and the working pressures the hose will have to withstand during usage. For example in a hose having an inside diameter of six inches and constructed for dock and cargo use, the width of the strip C should be such as to enable the strip to be wound into five plies, as is illustrated in the drawing. The type of fabric used for the layer C is preferably a woven duck fabric whose weight depends again on the use to which the hose is to be put and in which the warp threads preferably have a tensile strength twice as great as the tensile strength of the weft threads and extend longitudinally of the strip. The fabric strip C is wound in place on the hose with the warp threads extending longitudinally thereof, as is indicated by the arrow designated M in Fig. 1 of the drawing, so that the resistance of the tube formed thereby against destruction is materially greater in a longitudinal direction than in a transverse direction. Thus the plies of fabric C while forming by their convolutions a strong resistance against bursting pressures, form a much greater resistance against deformation or destruction of the hose by longitudinal stresses. This arrangement of the fabric C also restricts elongation of the hose during usage thereby preventing a separation of the bonds between the several layers of which the hose is composed while at the same time enabling the hose to withstand sharp bends. The layer of fabric C is preferably impregnated with a fluid-resisting compound for preventing the liquid being transferred through the hose from percolating through such fabric into the outer layers of material of which the hose is composed.

Over the fabric C and bonded to the outer layer thereof is superimposed a layer of rubber D whose thickness and composition are determined by the requirement as to the type of service for which the particular hose is designed to withstand. In an ordinary oil hose having an inside diameter of approximately six inches the layer D is applied over the fabric C in the form of a tube at a thickness of $\frac{1}{8}$ of an inch. The purpose of the rubber layer D is to form a cushion between the fabric C and the wire E which is seated on its exterior surface.

The wire E which is wound on the rubber layer D in the form of a helix is made of steel or duro-aluminum and has a width substantially greater than its thickness, the upper and lower surfaces of the wire being convex in shape and the edges thereof being rounded so as to present no sharp cutting surfaces to the materials adjacent thereto. I prefer to make the wire of full oval cross-section, that is, one in which the edges are rounded so that the cross-sectional area of the wire corresponds to a true oval, as I have found that a wire so formed is best suited for the purposes of the invention and gives the best results. The dimensions of the wire are governed by the inside diameter of the hose and the working pressures the hose will be subjected to during usage. Suitable dimensions for the wire in a hose having an internal diameter of approximately six inches, would be $\frac{5}{8}$ of an inch wide and $\frac{1}{4}$ of an inch thick. The size of the wire from these dimensions will vary proportionally to the size of the hose and the pressure the hose is to withstand. The wire E is wound on the rubber layer D under heavy tension so that it is embedded in the rubber layer to a depth approximately one-half the thickness of the rubber. In other words, in a rubber layer $\frac{1}{8}$ of an inch thick, the wire will be placed thereon under sufficient pressure to bring the lower surface thereof to at least within $\frac{1}{32}$ of an inch of the interior surface of the rubber layer D. In the illustrated size of hose the coils of wire will be spaced $\frac{7}{8}$ of an inch apart, such spacing being increased or decreased according to variations of the interior diameter of the hose and the pressures which the hose will have to resist in its usage.

It will be clear from Fig. 2 of the drawing that due to the convex form of the upper and lower surfaces of the wire E, the latter will function in the nature of a rocker when the hose is bent one way or the other. This configuration of the wire not only prevents a separation from the wire of the rubber layer D and the overlying rubber layer G during such deflection of the hose but also prevents separation from such layers when the hose is subjected to elongating stresses, the wire in this connection functioning together with the fabric layers C to resist any tendency of the hose to elongate. The full oval shape of the wire prevents any tendency of the wire to cut the rubber layer D. Due to this bonding of the wire with the rubber layers and the extent to which it is embedded in the rubber layer D, the wire will not slip out of place when the hose is flexed in any direction, the construction and arrangement of the wire on the hose greatly increasing the flexibility of the hose and preventing any tendency of the hose to kink. The oval wire E gives great physical support to the above described portions of the hose and is a powerful protection for the fabric layers C as it not only materially increases the bursting strength of such layers but produces great resisting strength against crushing of such layers.

The anchorage of the wire E is enhanced by a strip of fabric F which is helically wound on the hose intermediate the coils of the wire E, the width of the fabric being such that its edge portions overlap the side edges of the wire. In a hose such as has been described the width of the fabric F is preferably about $1\frac{3}{8}$ inches wide so that it will extend over the edges of the wire approximately $\frac{1}{4}$ of an inch. It will be seen from Fig. 2 of the drawing that the fabric strip F together with the rubber layers D and G, firmly anchor the coils of the wire and prevent any tendency of such coils to slip out of their assembled position during usage of the hose. At the same time the fabric strip F together with the wire E forms a series of knuckle joints which permits of extreme flexibility of the hose without danger of the parts tearing loose from one another. The fabric F is preferably made of a heavy duck material, such as belting duck, and like the fabric strip C is composed of longitudinally extending warp threads which are twice as strong as the weft threads thereof. Thus when the fabric is wound in position on the hose with the warp threads running spirally around the hose, as is indicated by the arrow designated N in Fig. 1 of the drawing, it materially reenforces the fabric C and tube A against transverse stresses without stiffening such parts. This strength may be increased with no sacrifice as to flexibility by using two or even three plies of the fabric F between the coils of the wire E.

Over the flexible layer composed of the wire E and the fabric strip F, is superimposed a relatively thick layer of rubber G which together with the rubber layer D unites the wire E and strip F together and assists in maintaining them in proper assembled relationship throughout the life of the hose while yet enabling the hose to flex freely in any direction with a minimum of strain. Overlying the layer of rubber G is a covering construction composed of one ply of open meshed fabric H, a layer of rubber I, a second layer of open meshed fabric J and an outer covering layer of rubber K. The fabrics H and J may be made of "Leno" cloth and together with the rubber layers I and K are inseparably bonded together to provide an outer protecting coating which prevents the hose from becoming chafed and enables it to withstand abrasion and penetration into the main structure thereof, of moisture, oil, etc.

It will appear from the foregoing that the present invention provides a hose construction on which chafing and wear will be minimized and which will present practically no resistance to the flow of liquids therethrough. Due to the novel arrangement of the fabric layers C and the flexible joint composed of the wire E and fabric strip F, the greatest degree of flexibility in the hose is maintained while at the same time a strong structure is provided which will successfully resist crushing or bursting pressures and longitudinal stresses. The combined construction functions under such stresses to bring about a uniform strain throughout the several layers of materials. The wire E due to its special conformation and the arrangement of the adjacent cooperating layers will be prevented from moving or slipping from its assembled condition and will not rupture either of the rubber layers D and G. The arrangement of these parts also prevents destructive elongation of any part of the hose and greatly increases the safety factor of the hose.

While in the foregoing description I have described a preferred embodiment of the invention, it will be understood that various changes and modifications of such embodiment may be made within the scope of the accompanying claims without departing from the spirit of my invention.

I claim:

1. In a construction of hose, the combination of, an inner tube composed of a material resistant to the fluid to be transferred in the hose and forming a continuous, uninterrupted, tubular surface forming a passageway for such fluid, an open mesh fabric intermediate said inner tube and a plurality of plies of fabric material wound into tubular form, the material of which said inner tube is constituted penetrating said open mesh fabric and anchoring itself to the inner ply of the fabric material, a tubular layer of rubber around said tubularly wound fabric and bonded thereto, a wire helically wound on said rubber layer, the coils of the wire being depressed to a distance less than their thickness in said rubber layer and compressing the underlying portions of said rubber layer, said wire having greater width than thickness and having convexed outer and inner surfaces, the sides of said wire being rounded so as to present no sharp cutting edges, a strip of fabric helically wound on said rubber layer intermediate the coils of said wire and having its edge portions overlapping the side edges of the said wire and a second tubular layer of rubber overlying said strip of fabric and said wire and being bonded to the outer surfaces of the helical coils of said fabric and to the outer surfaces of the wire, said strip of fabric and said wire separating said first layer of rubber from said second layer of rubber and forming a series of flexible joints longitudinally of the hose.

2. In a construction of hose, the combination of a plurality of plies of fabric material wound into tubular form and presenting an outer surface substantially cylindrical and free from corrugations, a tubular layer of rubber around said plies of fabric material, a wire helically wound on the outer surface of said rubber layer, the coils of the wire being depressed to a distance less than their thickness in said rubber layer and compressing the underlying portions of said rubber layer, said wire having greater width than thickness and having convexed outer and inner surfaces, the sides of said wire being rounded so as to present no sharp cutting edges, a strip of fabric helically wound on said rubber layer intermediate the coils of said wire, the body portion of said strip being positioned closer to the axial center of the hose than the outer surfaces of said wire and the edge portions of said strip extending outwardly and overlapping the side edges of said wire, and a second tubular layer of rubber overlying said strip of fabric and said wire and being bonded to the outer surfaces of the helical coils of said fabric and to the outer surfaces of said wire, said second rubber layer being thinner in the regions thereof overlying the wire coils and said strip of fabric and said wire separating said first layer of rubber from said second layer of rubber and forming a series of flexible joints longitudinally of the hose.

3. In a construction of hose, the combination of a plurality of plies of fabric material wound into tubular form and presenting an outer surface substantially cylindrical and free from corrugations, a tubular layer of rubber around said plies of fabric material, a wire helically wound on the outer surface of said rubber layer and having a cross-section of true oval form, said wire being depressed in said rubber layer to a distance less than its thickness and approximately one-half the thickness of said layer and compressing the underlying portions of said rubber layer, a strip of fabric helically wound on said rubber layer intermediate the coils of said wire, the body portion of said strip being positioned closer to the axial center of the hose than the outer surfaces of said wire and the longitudinal edge portions of said strip extending outwardly and overlapping the edges of said wire, and a second tubular layer of rubber overlying said strip of fabric and said wire and being bonded to the outer surfaces of said fabric and wire, said second rubber layer being thinner in the regions thereof overlying the coils of said wire and said strip of fabric and said wire separating said first layer of rubber from said second layer of rubber and forming a series of flexible joints longitudinally of the hose.

4. In a construction of hose, the combination of an inner tube composed of a material resistant to the fluid to be transferred in the hose and forming a continuous, uninterrupted tubular surface forming a passageway for such fluid, a plurality of plies of fabric material wound into tubular form about said inner tube so as to present an outer surface substantially cylindrical and free from corrugations and being bonded to the latter, a tubular layer of rubber around said plies of fabric material, a wire helically wound on said rubber layer, the coils of the wire being depressed to a distance less than their thickness in said rubber layer and compressing the underlying portions of said rubber layer, said wire having greater width than thickness and having convexed outer and inner surfaces, the sides of said wire being rounded so as to present no sharp cutting edges, a strip of fabric helically wound on said rubber layer intermediate the coils of said wire, the body portion of said strip being positioned closer to the axial center of the hose than the outer surfaces of said wire and having its longitudinal edge portions overlapping the edges of said wire, a second tubular layer of rubber overlying said strip of fabric and said wire and being bonded to the outer surfaces thereof, said second rubber layer being thinner in the regions thereof overlying the coils of said wire and said strip of fabric and said wire separating said first layer of rubber from said second layer of rubber and forming a series of flexible joints longitudinally of the hose.

5. In a construction of hose, the combination of an inner tube composed of rubber material resistant to hydrocarbons and forming a continuous, uninterrupted tubular surface forming a passageway for hydrocarbon fluids, a plurality of plies of duck wound into tubular form so as to present an outer surface substantially cylindrical and free from corrugations and having the warp threads thereof extending lengthwise of the tube, the inner ply of such duck material being bonded to said inner rubber tube, a tubular layer of rubber around said plies of duck, a wire helically wound on said second rubber layer, the coils of the wire being depressed less than their thickness in said rubber layer and compressing the underlying portions of said rubber layer, said wire having a cross-section of full oval form so as to present no cutting dges to said second layer of rubber, a strip of heavy duck helically wound on said second rubber layer intermediate the coils of said wire, the body portion of said strip being positioned closer to the axial center of the hose than the outer surfaces of said wire and the longitudinal edge portions of said strip extending outwardly and overlapping the side edges of the wire, said strip of heavy duck having the warp threads thereof extending lengthwise of the strip so as to materially increase the resistance of said tube of fabric against bursting pressures, a third layer of rubber overlying said strip of fabric and said wire and being bonded to the outer surfaces thereof, said third rubber layer being thinner in the regions thereof overlying the coils of said wire, and said strip of duck and said wire separating said second layer of rubber from said third layer of rubber and forming a series of flexible joints longitudinally of the hose and a covering layer of material over said last-mentioned layer of rubber and being bonded thereto.

6. In a construction of hose, the combination of a strip of fabric material wound lengthwise into tubular form and presenting an outer surface substantially cylindrical and free from corrugations, one set of threads of said fabric extending longitudinally of said tube and being materially stronger than the threads transverse thereto, a tubular layer of rubber around said fabric material, a wire helically wound on the outer surface of said rubber layer, the coils of the wire being depressed to a distance less than their thickness in said rubber layer and compressing the underlying portions of said rubber layer, said wire having greater width than thickness and having convexed outer and inner surfaces, the sides of said wire being rounded so as to present no sharp cutting edges, a strip of fabric helically wound on said rubber layer intermediate the coils of said wire, the body portion of said strip being positioned closer to the axial center of the hose than the outer surfaces of said wire and the longitudinal edge portions of said strip extending outwardly and overlapping the edges of said wire, said fabric having longitudinally extending threads which are materially stronger than the threads transverse thereto, and a second tubular layer of rubber overlying said last-mentioned strip of fabric and said wire and being bonded to the outer surfaces of said fabric and wire, said second rubber layer being thinner in the regions thereof overlying the coils of said wire, and said strip of fabric and said wire separating said first layer of rubber from said second layer of rubber and forming a series of flexible joints longitudinally of the hose.

ERNEST SCHULTHESS.